United States Patent [19]
Ruediger

[11] 4,041,600
[45] Aug. 16, 1977

[54] METHOD OF ASSEMBLING STORAGE SYSTEM

[75] Inventor: Frederick Ruediger, Willow Grove, Pa.

[73] Assignee: Standard Pressed Steel Co., Jenkintown, Pa.

[21] Appl. No.: 668,369

[22] Filed: Mar. 19, 1976

[51] Int. Cl.[2] ........................ B21D 39/00; B23P 11/02
[52] U.S. Cl. ........................................ 29/513; 29/21.1; 211/182; 211/183
[58] Field of Search ..................... 29/155 R, 513, 21.1; 211/182, 183, 191

[56] References Cited

U.S. PATENT DOCUMENTS

| | | | |
|---|---|---|---|
| 2,533,779 | 12/1950 | Emde | 29/513 UX |
| 2,776,030 | 1/1957 | Bush | 211/182 UX |
| 2,871,556 | 2/1959 | Chisholm | 29/513 |
| 2,967,337 | 1/1961 | Hedreck | 29/513 X |
| 3,031,088 | 4/1962 | Ribbens et al. | 211/182 X |
| 3,102,641 | 9/1963 | Konstant | 211/191 |
| 3,112,034 | 11/1963 | Kaufman et al. | 211/191 |
| 3,286,416 | 11/1966 | Ashworth | 29/513 X |
| 3,862,691 | 1/1975 | Mori et al. | 211/191 |

*Primary Examiner*—Charlie T. Moon
*Attorney, Agent, or Firm*—Andrew L. Ney; Aaron Nerenberg

[57] ABSTRACT

A method of attaching a support member formed with a hook member and a bendable tab member to a support post formed with a plurality of slots is disclosed and comprises the steps of engaging the hook member in a slot on the post member such that a portion of the hook member underlies the outer surface of the post member, rotating the support member so that the tab member is inserted in another slot on the post member and applying a bending force to the tab member to bend the tab member toward the hook member such that the tab member also underlies the outer surface of the post member. Simultaneous with applying the bending force a reaction surface is provided in the slot in which the hook member is engaged so that the bending force reacts through the reaction surface and the post member.

A tool usable in the above described method comprises a handle portion having an arcuate bending finger at one end and which is pivotally connected to a reaction finger having planar bearing surfaces. In use the reaction finger is placed in the slot in which the hook member is received and then the bending finger is inserted into the slot in which the tab member is received. Force is then applied to the handle portion which is applied to the tab member through the bending finger and which reacts through the reaction finger.

4 Claims, 5 Drawing Figures

METHOD OF ASSEMBLING STORAGE SYSTEM

This invention relates to a method of attaching a support member to a support post and, more particularly, to such a method utilizing a hook member and a bendable tab member and also to a tool particularly useful in carrying out the method.

In various storage systems, it is desirable to connect the actual support members to a system of vertical support posts in a generally permanent manner so that ease of assembly or disassembly is not a particular requirement of the system. For example, in storage systems of the type used with automated retrieval apparatus, support members are utilized which provide a track along which storage containers can slide during their insertion or removal from a storage space and which function to support the storage containers in the storage space after their insertion. Usually, the retrieval apparatus is arranged to slide along a generally fixed path so that disassembly of the storage system is not a necessary requirement of the storage system.

In storage systems of the type noted, easy connection and disconnection means could be utilized to secure the support members to the vertical support posts, but it is noted that the automatic retrieval apparatus or a storage container could hit the storage system during insertion or removal and inadvertently disconnect the support member. Thus, it is usual to connect the support members to the support posts by using various positive interlocking fastener assemblies. Some of the more commonly used fastener assemblies include nut an bolt combinations, expandable plug members and blind rivets. While these noted assemblies function in a generally satisfactory manner, excessive manipulation is required when assembling the storage system so that it is a relatively time consuming and expensive procedure.

One type of storage system which is easily and quickly assembled without the use of fastener assemblies of the type noted above includes a support member including connecting means in the form of a hook member and a bendable tab member which cooperate with slots formed on a support post. In use the hook member is inserted into one of the slots on the support post and the tab member is inserted into another slot on the support post. Thereafter a bending force is applied to the tab member to bend it toward the hook member. Both the hook member and the tab member then cooperate to securely retain the support member on the support post.

When assembling storage systems with the hook and tab arrangement noted it has been found that the use of conventional prying tools is not entirely satisfactory. As a conventional tool applies the bending force it bears on a portion of the support member and a reaction force is applied to the support member which bends or otherwise damages that member. If the damage occurs to a track surface, the support member could be rendered useless.

Accordingly, it is a primary object of this invention to provide a method of assembling a support member to a support post by using a hook member and a bendable tab member such that the support member is not damaged when the tab member is bent.

It is another primary object of this invention to provide a tool useful in bending a tab member without damaging a support member on which the tab member is located.

These and other objects of this invention are accomplished by providing support posts having aligned slots extending along at least one face and erecting the support posts in a generally vertical position. Also provided is a support member having a first leg providing a track surface and a second leg having a guide surface and also provided with first connecting means at one end and second connecting means at the other end. Each connecting means includes a hook member and a tab member, each of the tab members forms an angle greater than 90° with the portion of the second leg between the hook member and the tab member. The hook members are inserted into aligned slots on adjacent support posts and the support member is rotated to insert the tab members into other slots on the support posts. Thereafter a bending force is applied to the tab members to bend the tab members toward the hook members until the tab members form an angle less than 90° with the portion of the second leg between the hook members and the tab members. Simultaneous with applying the bending force, a reaction surface is provided in the slot in which the hook member is engaged so that the bending force reacts through the reaction surface and the post member.

Also provided in accordance with this invention is a tool for applying the bending force which tool includes an elongated member having a handle portion and a generally arcuate bending finger. Pivotally attached to the elongated member is a reaction finger having generally planar reaction surfaces and which extends axially of the elongated member farther than the bending finger. The bending finger is curved in a direction toward the reaction finger. In use the reaction finger is inserted in the slot which the hook member is engaged and the bending finger is inserted in the slot in which the tab member is engaged. Force is applied to the handle portion which is applied to the tab member through the bending finger and which reacts through the reaction finger and the support post.

For a better understanding of the invention, reference is made to the following description of a preferred embodiment thereof taken in conjunction with the figures of the accompanying drawing, in which.

Figure 1:
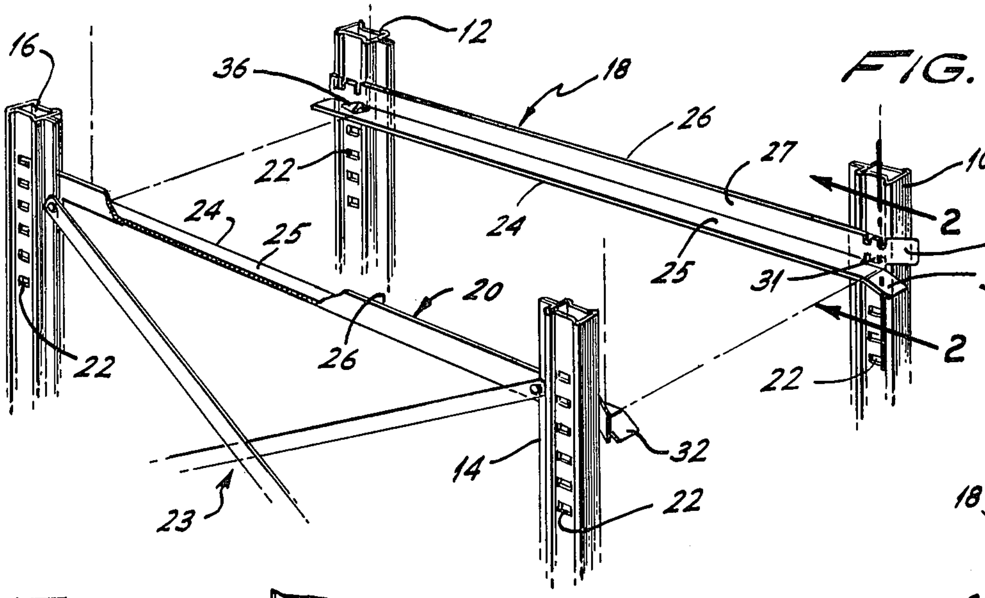
FIG. 1 is a perspective view of an assembled storage system in accordance with this invention.

Referring now to FIG. 1 of the drawing, a preferred embodiment of the invention is illustrated which is particularly adaptable to slidingly receive and thereafter support storage containers (shown in phantom lines in FIG. 1) and which is particularly useful with automatic retrieval and insertion apparatus. Included is a plurality of generally vertical support posts 10, 12, 14 and 16 arranged in a pattern such that they are located at the corners of an imaginary rectangle. Across a first pair of posts, 10 and 12, is a first support member 18 and across a second pair of posts, 14 and 16, is a second support member 20. As will be made clear hereinafter, the support members 18 and 20 are arranged on the support posts to provide tracks along which storage containers may slide and on which the storage containers are supported. It should be understood however, that in certain embodiments of the invention a support member in the form of a shelf could be utilized in place of the track arrangement.

All of the support posts 10, 12, 14 and 16 are generally the same and are formed along at least one face thereof with a plurality of slots 22 such that the slots on any post are vertically aligned and such that the slots on adjacent posts are horizontally aligned. Preferably, opposite faces of each post are formed with slots to obviate orientation problems during assembly an also to allow one pair of posts to support a pair of support members, one such member being supported on opposite faces of the post. The cross-sectional shape of the support posts may be any desired configuration and cross braces 23 may be used to add rigidity to the assembled system. It should be understood that any desired bracing arrangement can be utilized.

The support members 18 and 20 are generally the same except that one is a mirror image of the other. Each support member is generally elongated and has an L-shaped cross-sectional configuration. Thus, each support member includes a first leg 24 and a second leg 26 forming a generally right angle with the first leg. The first leg 24 extends only a relatively short distance from the second leg 26 and the upper surface 25, as viewed in the drawing, provides a track surface over which storage containers can slide and on which the storage containers are supported. The second leg 26 also extends only a relatively short distance from the first leg 24 and provides a surface 27 that guides the storage containers on the track surface 25 during the insertion and removal procedures. The interior surfaces, that is surfaces 25 and 27 of each support member 18 and 20 provide a storage space for the containers. The surface of second leg 26 opposite guide surface 27 is formed with first and second connecting means, one at each end of a support member, which connect each support member to a pair of vertical support posts. Briefly, the connecting means are in the form of a hook member 28 and a tab member 30.

Adjacent one end, the leg 24 of each support member is formed with an inclined surface 32 extending in a direction opposite that of leg 26 and the leg 26 is formed with an inclined surface 34 extending in a direction opposite that of leg 24. That is, the inclined surfaces 32 and 34 extend away from the storage space defined by the support members 18 and 20. In use, the inclined portions 32 and 34 facilitate insertion of the storage containers onto the track surface 25 and this is particularly useful with automatic retrieval systems where misalignment of the storage container and the track surfaces can occur. In addition, a stop means 36 is provided at the other end of the support members 18 and 20 to limit movement of the storage container so that it cannot be inserted beyond the storage space when it is inserted on the track surfaces. In the preferred embodiment of the invention illustrated herein, the stop means 36 is formed on the track surface 25 of the leg 24 and is formed by material struck upwardly from the leg 24 into the path of a storage container on the track surface.

The connecting means are generally the same and, accordingly, only one will be particularly described. Each hook member 28 is struck out from the second leg 26 adjacent the free edge thereof and extends in a direction opposite that of leg 24. The hook member can be any generally conventional configuration which can be inserted through a slot 22 and underlie the outer surface of a support post. The tab member 30 is spaced from the hook member 28 a distance generally equal to the distance between adjacent slots 22 on the support posts and is located adjacent the line of intersection of the two leg members 24 and 26. Preferably both the hook member 28 and the tab member 30 are struck out from the second leg 26 and are of a width slightly less than that of the width of the slots 22 so as to be received therein. The tab member 30 is bendable about its line of connection with the second leg 26 and initially forms an angle greater than 90° with that portion of the second leg 26 between the hook member 28 and the tab member. Preferably, the tab member forms an angle of 105° with the noted portion of the second leg. As will be made clear hereinafter, use of an angle greater than 90° permits insertion of the tab member into a slot 22 on a support post after the hook member 28 has been engaged with an adjacent slot on the support post. In addition, it should be noted that the tab member after insertion into a slot 22 is bent back toward the hook member until it forms an angle less than 90° with the portion of the second leg 26 located between the hook member 28 and the tab member 30. After bending, the tab member 30 underlies the outer surface of the support post as clearly seen in FIG. 4 and, thus, the support member is securely connected to the support post. To allow insertion of a prying tool for applying the bending force and access slot 31 is formed adjacent the tab member 30.

Figure 4:
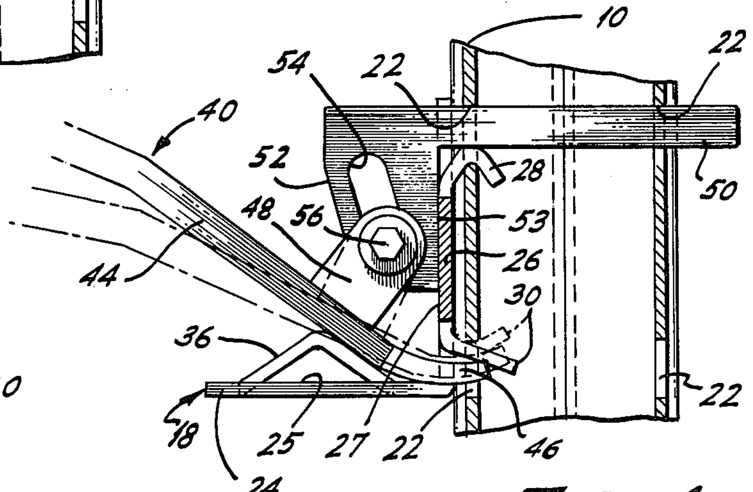
Figure 5:
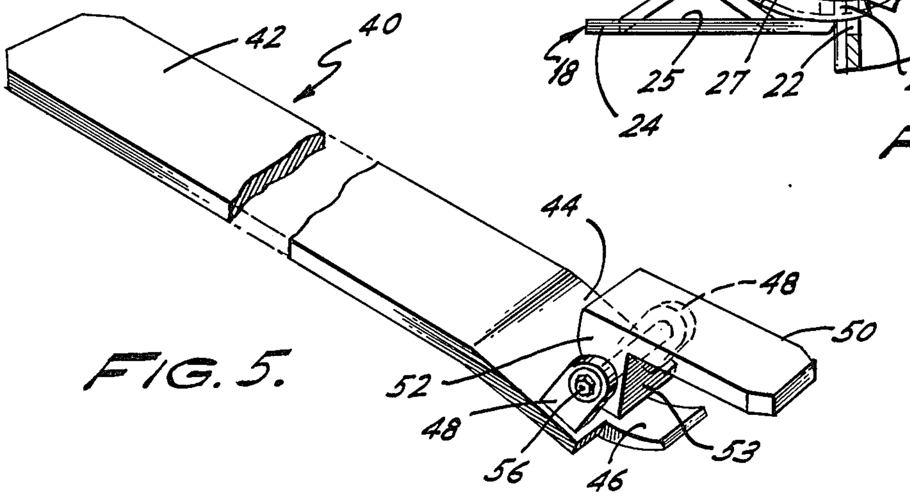
FIG. 5 is a perspective view of a tool in accordance with this invention usable to assemble a storage system.

Before explaining the method of attachment, reference is made to FIG. 5 of the drawing wherein a tool in accordance with this invention is illustrated. The tool 40 includes an elongated member having a handle portion 42 at one end, an inclined portion 44 extending therefrom and an arcuate finger 46 for bending the tab member 30. As clearly seen in the drawing, the finger 46 has a reduced width relative to that of the handle portion 42 and the inclined portion 44 and is of a width such that it fits in the slots 22 on the support posts. A pair of lugs 48, 48 are formed on the inclined portion 44 and pivotally carry a reaction finger 50 having planar top and bottom surfaces and also having a width to fit in the slots 22. The finger 50 is formed with a transversely extending ear portion 52 fitting between lugs 48, 48 and is formed with an elongated slot 54 which receives a pin 56 extending through the lugs to provide the pivoted connection between the second finger and the elongated member. The interior surface 53 of the ear 52 is formed with a planar surface for a purpose to be explained hereinafter. As clearly seen in both FIGS. 4 and 5 of the drawing, the finger 50 extends farther in the axial direction of the tool than does the finger 46, that is, the finger 50 extends beyond the finger 46. Preferably the second finger 50 extends a distance such that it fits across adjacent slots 22 formed in opposite faces of a support post. The fingers 46 and 50 are spaced apart a distance generally equal to the distance between adjacent slots 22 formed on the same face of a support post and also the distance between the hook member 28 and the tab member 30 of any connecting means.

Figure 3:
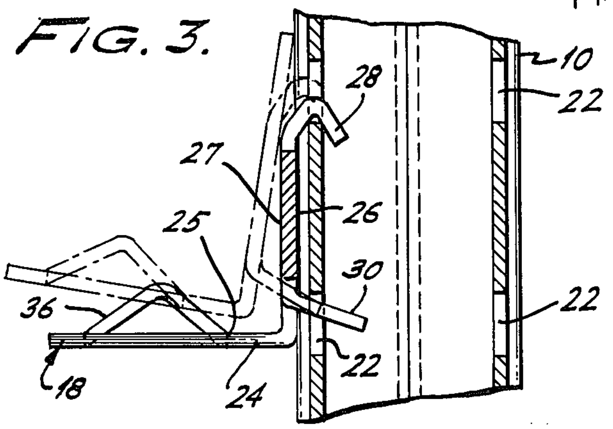
FIGS. 3 and 4 are sectional views illustrating various steps in the method of assembling a support member to a support post in accordance with this invention.
Figure 2:
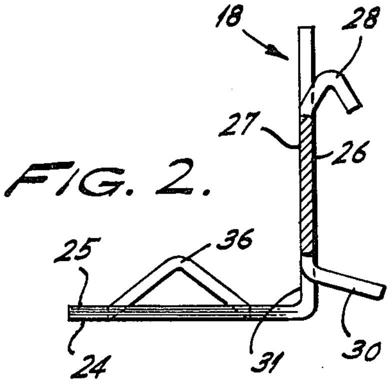
FIG. 2 is a sectional view taken along line 2—2 of FIG. 1 and illustrating one of the support members.

To assemble the support system, the posts 10, 12, 14 and 16 are arranged with their longitudinal axes in vertical positions such that the slots 22 on each post are in vertical alignment and such that the slots on posts 10 and 14 face each other and further such that the slots on posts 12 and 16 also face each other. In addition slots 22 on each post are horizontaially aligned slots form a generally horizontal plane. For purposes of this explanation the assembly of the support member 18 to the support posts 10 and 12 will be explained. The support member 18 is cocked on an angle relative to the support posts 10 and 12 and the hook members 28, 28 are inserted into horizontally aligned slots 22 as shown in phatom lines in FIG. 3. A portion of the hook members 28, 28 underlie the outer surface of the support posts 10 and 12. At this point, the support member 18 is rotated in a counter-clockwise direction as seen in FIG. 3 so that the tab members 30, 30 are inserted into horizontally aligned slots 22, 22 spaced below the slots in which the hook members 28, 28 are received as shown in solid in FIG. 3 of the drawing. Because the angle between the tab member and the portion of the second leg 26 extending between the hook 28 and the tab member is greater than 90°, insertion of the tab members 30, 30 is readily accomplished. At this point, the bending force is applied to the tab member 30 causing it to bend back toward the hook member forming an angle less than 90° with the portion of the leg member 26 between the hook member 28 and the tab member. As will be made clear hereinafter simultaneous with the application of the bending force reaction surfaces are provided adjacent the hook member 28 and the slot 22 in which the hook members are received so that the bending force reacts through the reaction surface, the hook member and the slot. The tab members 30, 30 now underlie the outer surface of the support posts 10 and 12 and cooperate with the hook members 28, 28 to securely retain the support member 18 to the support posts. The method is repeated for securing support member 20 to support posts 14 and 16.

When using the tool 40 to bend the tab members, the reaction finger 50 is inserted in the slot 22 in which the hook member 28 is received and extends across the support post such that it bears on the top of the hook member and is received in an aligned slot 22 formed in the opposite face of the support post. The interior surface 53 of the ear 52 bears on the guide surface 27 of the second leg 26 and thus the second leg is held in place on the support post. The arcuate finger 46 is now inserted through the slot formed when the tab member is struck out and into the slot 22 in which the tab member 30 is received so that it bears on the outer surface of the tab member 30 as illustrated in FIG. 4 of the drawing. Force is now applied to the handle portion 42 causing the elongated member to pivot about the pin 56 such that that bending finger 46 which is curved toward the second finger 50 applies a bending force to the tab member 30. The bending force applied to the tab member 30 reacts through the second finger 50, the top of hook member 28 and the top edges of the slots 22, 22 in which the second finger is received.

If an elongated prying tool were used having only one finger, it should be undertood that the prying finger would be inserted in the slot in which the tab member 30 is received and when the bending force is applied, would react on the track surface 25 and could cause the track surface to bend. Such bending would create problems during the insertion and removal of the storage containers and it is thus preferable to use the tool illustrated in FIG. 5 of the drawing.

While in the foregoing, a preferred embodiment of the invention has been described, it should be understood that various changes and modifications can be made without departing from the true spirit and scope of the invention as recited in the appended claims.

I claim:

1. A method of assembling a storage system including the steps of:

providing support posts having aligned slots extending along at least one face thereof;

erecting said support posts in a generally vertical position whereby said slots extend along a generally vertical line and face in the same direction;

providing a support member having a first leg providing a track surface along which storage containers can slide and on which storage containers can be supported, and having a second leg providing a guide surface for guiding storage containers sliding along said track surface, said second leg being provided with first connecting means at one end and second connecting means at the other end, said connecting means including a hook member and a tab member each of said tab members forming an angle greater than 90° with the surface portion of said second leg located between said hook member and said tab member;

inserting said hook members into aligned slots on said support posts so that said hook members underlie the outer surface of said post members, and rotating said support member to insert said tab members into other aligned slots on said support posts;

thereafter applying a bending force to said tab members to bend said tab members toward said hook members until said tab members form an angle less than 90 ° with the surface portion between said hook members and said tab members whereby said tab members underlie the outer surface of said support post members providing a reaction surface in said slots in which said hook members are received so that when said bending force is applied to said tab members it reacts through said reaction surface.

2. A method in accordance with claim 1 wherein said posts are provided with aligned slots on the face opposite said slots in which said hook members and said tab members are inserted, and wherein said reaction surface is provided through an aligned slot in said opposite face.

3. A method in accordance with claim 2 wherein a holding force is applied to said guide surface for holding said support member against said support posts as said bending force is applied.

4. A method in accordance with claim 1 wherein a holding force is applied to said guide surface for holding said support member against said support posts as said bending force is applied.

* * * * *